A. J. FORBES.
SAFETY COUPLING FOR MOTOR PLOWS AND THE LIKE.
APPLICATION FILED APR. 23, 1919.
1,364,628. Patented Jan. 4, 1921.
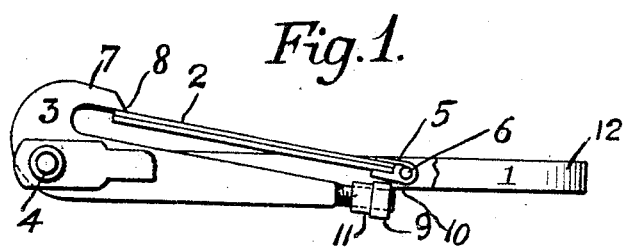
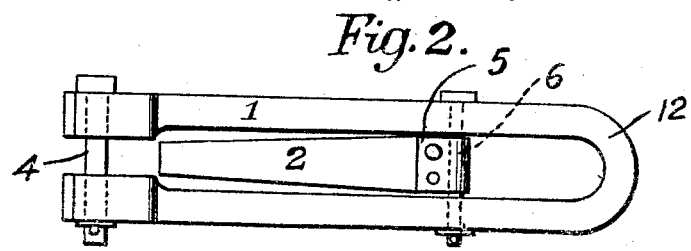
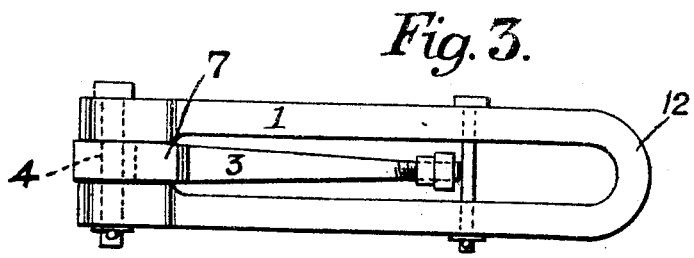
Inventor
Alexander J. Forbes
By Knight Bros
Attorneys

UNITED STATES PATENT OFFICE.

ALEXANDER JOHN FORBES, OF NORTH KESSOCK, BY INVERNESS, SCOTLAND.

SAFETY-COUPLING FOR MOTOR-PLOWS AND THE LIKE.

1,364,628.     Specification of Letters Patent.     Patented Jan. 4, 1921.

Application filed April 23, 1919. Serial No. 292,219.

*To all whom it may concern:*

Be it known that I, ALEXANDER JOHN FORBES, a subject of the King of the United Kingdom of Great Britain and Ireland, and resident of Brooklea, North Kessock, by Inverness, Scotland, gentleman, have invented certain new and useful Improvements in Safety-Couplings for Motor-Plows and the like, of which the following is a specification.

This is a spring coupling which is inserted in the train connecting the motive power with the mechanism acted on; and is intended to prevent the breakage of parts, when the load is subjected to sudden and great increase. It is specially applicable to motor plows, which meet with obstructions underground.

In this coupling a very simple system of compound levers is used, which greatly reduces the pressure on the spring, which consequently may be quite slender, while at the same time it is more sensitive, and has less friction.

The coupling consists mainly of three parts:—

(1) A long link, (2) a flat spring, which acts as a lever of the third order, and (3), a drawbar, which acts as a lever of the first order. The accompanying drawings will explain this.

Figure 1 is a side elevation of the coupling, with part of the near side of the link cut away, showing all the parts in place.

Fig. 2 is a plan of the link showing the spring 2.

Fig. 3 is a plan of the link showing the drawbar 3.

The spring 2, which may consist of one or more laminæ, is hinged at one end 5, on a pin 6, which passes transversely through both sides of the link 1.

The drawbar 3 is hinged on the bolt 4, which passes transversely through both sides of the link 1 near the end. On the side of the drawbar near the end is a hook 7 under which the free end of the spring can catch. On the other end of the drawbar is an adjusting nut 9, which presses on the spring 2 at 10. A second nut 11 acts as a lock nut. These nuts may be dispensed with as the coupling can be adjusted to load by having the spring bolted to its hinge through a slot, so that it can be made to take more or less hold of the hook.

The action of the coupling is as follows:—

The end 12 of the link 1 is attached to the tractor, and the end link of the drag chain is coupled on the hook 7 of the drawbar 3. The power acts lengthwise in the direction of the coupling on the hook 7; the fulcrum is at 4, and the weight at 10.

On the spring the power acts at 10, the fulcrum is at 6, and the weight at 8. When in action the pressure on the spring causes it to bend, and, when the pressure exceeds a certain limit—as when the plow meets an obstruction underground—the spring 2 slips out of the hook 7, the drawbar 3 rotates around its fulcrum 4, and instantly sets free the drag chain and the plow, thus preventing breakage of parts.

Claims—

1. A draft coupling comprising a coupling member, a draw-bar pivoted at one end to one end of said member, a coupling hook on the pivoted end of said draw-bar, a flexible member pivoted at one end to said coupling member and adapted with its free end to engage said hook, said flexible member being so positioned in relation to said draw-bar that the free end of the draw-bar will flex said flexible member when the draft pull exceeds a given amount until the free end of said flexible member is caused to automatically disengage itself from said hook.

2. A draft coupling comprising a coupling member, a draw-bar pivoted at one end to said member, a coupling hook on the pivoted end of said draw-bar, a blade spring pivoted at one end to said coupling member and adapted to engage said hook with its opposite end, said spring being so positioned that the free end of said draw-bar will exert pressure against said spring in proximity to the pivoted end thereof when the draft pull exceeds a given amount and thereby cause the free end of said spring to disengage itself from said hook.

3. A draft coupling comprising a coupling member, a draw-bar pivoted at one end to one end of said member, a coupling hook on the pivoted end of said draw-bar, a flexible member pivoted at one end to said coupling member and adapted with its free end to engage said hook, said flexible member being so positioned in relation to said draw-bar that the free end of the draw-bar will flex said flexible member when the draft pull exceeds a given amount until the free end of said flexible member is caused to automatically disengage itself from said hook and means for adjusting the relative positions of said flexible member and the free end of said draw-bar to adjust the release for different maximum loads.

4. A draft coupling comprising a coupling member, a draw-bar pivoted at one end to said member, a coupling hook on the pivoted end of said draw-bar, a blade spring pivoted at one end to said coupling member and adapted to engage said hook with its opposite end, said spring being so positioned that the free end of said draw-bar will exert pressure against said spring in proximity to the pivoted end thereof when the draft pull exceeds a given amount and thereby cause the free end of said spring to disengage itself from said hook and means adjustable longitudinally on the free end of said draw-bar for contact with said spring.

ALEXANDER JOHN FORBES.

Witnesses:
PETER ALEXANDER MANSON,
DUNCAN MACLEARY.